(No Model.)
A. J. & A. C. D. ANDRESEN.
GANG PLOW.
No. 503,515.
2 Sheets—Sheet 1.
Patented Aug. 15, 1893.
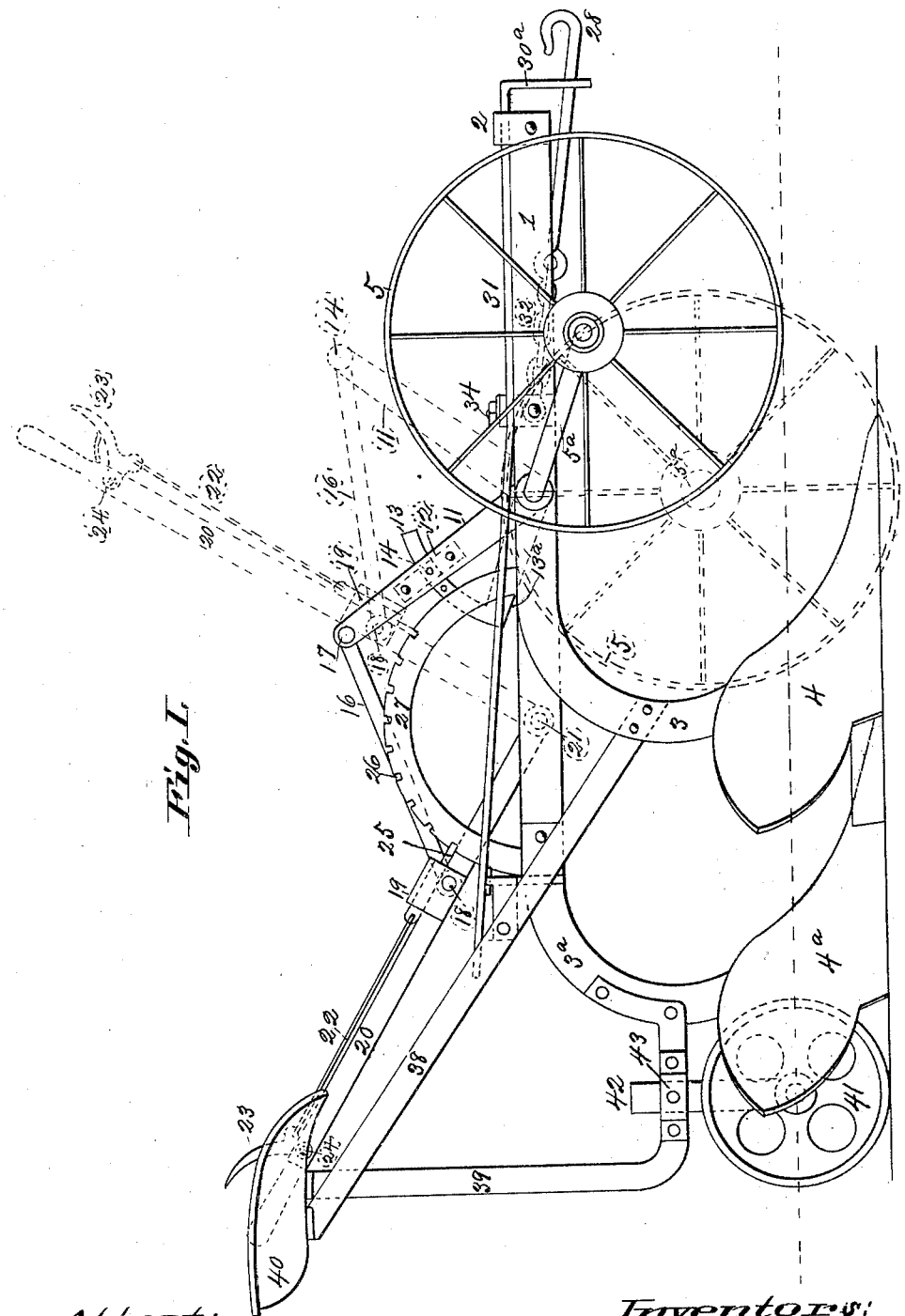
Attest:
Albert W. Eberole
G. J. Knight
Inventors:
Asmus J. Andresen
Andreas C. D. Andresen
By Knight Bros.
Attys.

(No Model.) 2 Sheets—Sheet 2.
A. J. & A. C. D. ANDRESEN.
GANG PLOW.
No. 503,515. Patented Aug. 15, 1893.
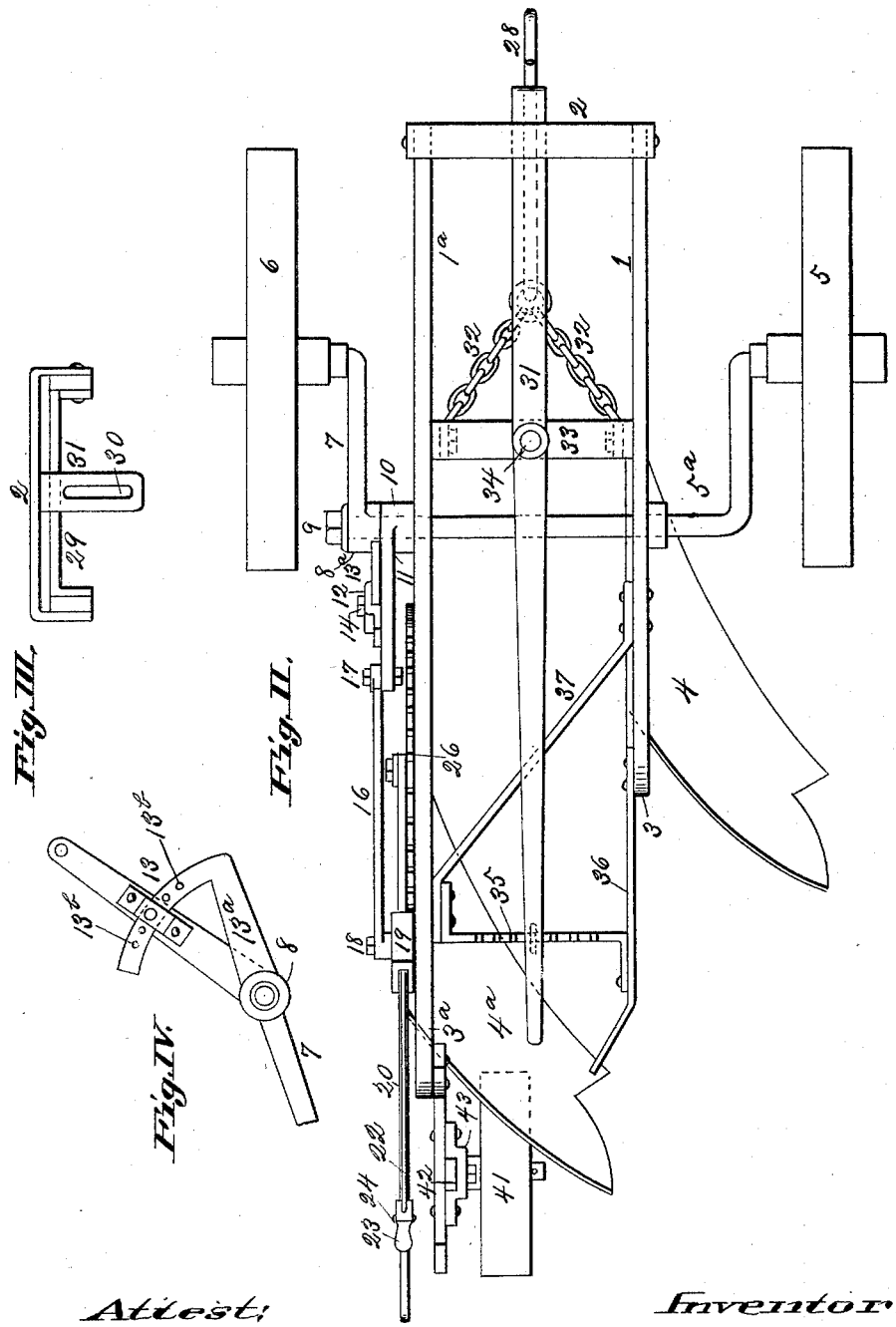
Attest:
Albert M. Ebersole
E. Knight
Inventors:
Asmus J. Andresen
Andreas C. D. Andresen
By Knight Bros.
Attys.

UNITED STATES PATENT OFFICE.

ASMUS J. ANDRESEN AND ANDREAS C. D. ANDRESEN, OF ST. LOUIS, MISSOURI.

GANG-PLOW.

SPECIFICATION forming part of Letters Patent No. 503,515, dated August 15, 1893.

Application filed March 6, 1893. Serial No. 464,816. (No model.)

*To all whom it may concern:*

Be it known that we, ASMUS J. ANDRESEN and ANDREAS C. D. ANDRESEN, both of the city of St. Louis, in the State of Missouri, have invented a certain new and useful Improvement in Gang-Plows, of which the following is a full, clear, and exact description, reference being had to the accompanying drawings, forming part of this specification.

The object of our improvement is to produce a gang-plow in which all of the plows may be simultaneously raised from and again lowered into the ground with a single operating lever as readily as those using two levers; and our invention also consists in an adjustable bar, connected to the draft bar within easy reach of the operator for regulating the width of furrow to be cut; also an adjustable mechanism by which the furrow wheel may be lowered into the furrow while the other wheel remains on the land, and the carriage that carries the plows remains in a level position.

Figure I is a side elevation of our improved plow, shown in its operative position, the furrow wheel appearing in full lines as when the first furrow is being cut, and in dotted lines when thrown into the furrow. Fig. II is a top view or plan. Fig. III is a detail elevation of the draft bar supporting bracket. Fig. IV is a detail, side elevation of the adjustable mechanism for regulating the depth of the furrow.

Referring to the drawings, 1 and 1ª represent the two parallel side bars, and 2 the cross-bar that connects the side bar of the plow frame together at the front end, and 3 and 3ª the downwardly curved rear ends of the side bars that form the plow beams to which the plows 4 and 4ª are secured by any suitable means.

5 represents the furrow wheel mounted on a crank axle, 5ª, and 6 the land wheel mounted on an eccentric arm 7, which has on its upper end a bearing 8 secured on the axle 6 by a nut 9.

10 represents a collar on the axle 6 between the bearing 9 and the side bar 1ª of the frame.

Formed on the collar 10 is an arm 11, on the side of which is secured a strap loop 12, in which fits the curved bar 13 of a segment arm 13ª formed on the bearing 8. The arms 11 and 13ª are secured together by a bolt 14 which passes through the arm 11 and one of a number of perforations 13ᵇ in the arm loop 13ª, and strap 12, and it is through this arrangement that the furrow wheel 5 is lowered into the furrow, when the plow is in use after making the first furrow, said adjustment being accomplished by removing the bolt 14 and dropping the arm 13ª back, or when it is desired to transfer the plow from place to place, the arm is drawn up and held by the bolt 14, by which movement the axle may be forced up, which will at the same time raise the furrow wheel to a level with the land wheel.

16 represents a bar pivotally connected at 17 at one end to the end of the arm 11, and at the opposite end is connected by a pivot 18 to a box sleeve 19 on the plow adjusting lever 20, the lower end of which lever is connected by a pivot 21 to the side bar 1ª of the plow frame.

22 represents a rod connected at its upper end to a trip lever 23, which trip lever is secured to the plow adjusting lever 20 by a pivot 24. To the lower end of the rod 23 is secured a sliding pawl 25 that moves in the box sleeve and when in its normal position engages in notches 26 in a segment bar 27.

28 represents a swinging draft bar which is supported at its outer end between the cross-bar 2 and the bar 29, said draft bar being held in a slot 30 of the downturned end 30ª of the draft regulating bar. The inner end of the draft bar is connected to chains 32, the inner ends of which are secured to the side rails of the plow frame, together with a cross-bar 33 to the side bars 1 and 1ª, and to this brace is pivotally connected, by a pivot 34, the draft bar 31. The draft bar 31 extends back to the rear end of the plow frame, within easy reach of the operator, and is supported on a notched cross-bar 35, one end of which bar 35 is secured to the plow beam 3ª, the other end to an extension 36 which is secured to the plow beam 3.

37 represents a brace that rigidly secures the plow beams a uniform distance apart, and 38 and 39 are braces attached to the plow beams, and on whose upper ends is mounted the operator's seat 40.

41 represents a follower plow sustaining wheel supported on the post 42, which fits in a bracket 43 formed on the seat supporting brace 39.

The operation of our plow is as follows:— In making the first furrow the wheels 5 and 6 tread upon the land adjusted in a horizontal position, but after the opening up furrow is cut, the furrow wheel 5 is lowered into the furrow, which is desirable as a guide for the operator, and which is readily accomplished by the withdrawing of the bolt 14, and allowing the arm $13^a$ to move back, which allows the axle $5^a$ to turn in the bearing 8 until the wheel 5 has reached the required depth. In this movement a certain number of perforations $13^b$ in the segment 13 are passed when the bolt 14 is replaced to secure the parts together so that thereafter the wheel 5 is at all times gaged to drop the same depth into the furrow until it is desired to change the depth to be plowed or to readjust to the former position when the bolt may be again removed and the segment 13 be moved forward or back and secured where desired. After the wheels are adjusted, as stated, the lever 20 is drawn back, in which movement the entire axle is rotated, lowering the frame and allowing the plows to descend to the ground. The lever is drawn back till the plows move down to the depth to which it is desired to break the ground, when the progress is arrested by the pawl 25 being brought into engagement with the notch 26 on the segment bar 27, nearest the desired point, as shown in Fig. I of the drawings. To elevate the plows from the ground the lever 20 is moved forward, as shown in dotted lines in Fig. I, and the connecting bar 16 forcing the arm 11 forward rotates the axle carrying the frame and beams to which the plows are secured up and the wheels down, the power being attached to the draft bar 28, which engages in the supporting bracket 30 on the bar 31, which is pivoted at 34, and which extends back, and is supported on the rack bar 35, within easy reach of the operator who may at will shift the rear end of the bar to the right or left, to throw the front end of the bar that engages the draft bar to the right or left, when a wider or narrower furrow is desired to be cut.

We claim as our invention—

1. In a gang plow, the combination of a frame forming the plow carriage, plows connected to said frame, an axle composed of a portion $5^a$, and an arm 7, a bearing on said arm fitting on the portion $5^a$, a collar loosely mounted on the portion $5^a$, an arm on said collar, an arm on said bearing, means of forming rigid connection between the collar, arm and bearing arm, and a lever connected to said collar arm; substantially as and for the purpose set forth.

2. In a gang plow, the combination of the frame, plows connected to said frame, a crank axle carrying the furrow wheel, an arm carrying the land wheel, a bearing on said arm connecting it to said crank axle, a collar loosely mounted on said crank axle, arms on said bearing and collar, perforations in said arms, a bolt removably engaging in said perforations to allow of adjustment between the crank axle and land wheel arm, to permit lowering of the furrow wheel; substantially as and for the purpose set forth.

ASMUS J. ANDRESEN.
ANDREAS C. D. ANDRESEN.

In presence of—
ALBERT M. EBERSOLE,
E. S. KNIGHT.